United States Patent
De Fasselle et al.

[15] 3,691,834
[45] Sept. 19, 1972

[54] VARIABLE AREA FLOW METER

[72] Inventors: Robert J. De Fasselle, Timberidge Trail, Gates Mills; Herbert W. Heisterkamp, University Heights, both of Ohio

[73] Assignee: Robert J. de Fasselle, Gates Mills, Ohio

[22] Filed: Aug. 21, 1970

[21] Appl. No.: 65,903

[52] U.S. Cl. .................................................73/208
[51] Int. Cl. ............................................G01f 1/00
[58] Field of Search.....................73/207–210, 205

[56] References Cited

UNITED STATES PATENTS

| | | | |
|---|---|---|---|
| 1,274,642 | 8/1918 | Wagner et al. | 73/208 |
| 2,350,343 | 6/1944 | Fischer | 73/209 |
| 2,370,634 | 3/1945 | Brewer | 73/209 |
| 2,970,561 | 2/1961 | Ashwood | 116/117 |
| 2,674,880 | 4/1954 | Broderson | 73/207 |

*Primary Examiner*—Richard C. Queisser
*Assistant Examiner*—Marvin Smollar
*Attorney*—Oberlin, Maky, Donnelly & Renner

[57] ABSTRACT

A variable area flow meter having a large range of flow measurement. The meter includes a body portion having inlet and outlet ends. An elongated upright core tube within the body portion receives the flow from the inlet end and is provided with at least one longitudinally extending slot by which the flow is transmitted to the outlet end. A float piston confined by the core tube rises in the tube to expose a greater area of the tube slot or slots as the flow increases, the piston being connected to a suitable indicator.

At a predetermined elevation, means may be provided for reducing the increments of movement which the float piston makes for each increment of increase in flow in the meter. This increases the effective range of the meter.

Means also are provided for varying the weight of the float piston to establish different ranges of flow measurement for fluids of different specific gravities.

13 Claims, 10 Drawing Figures

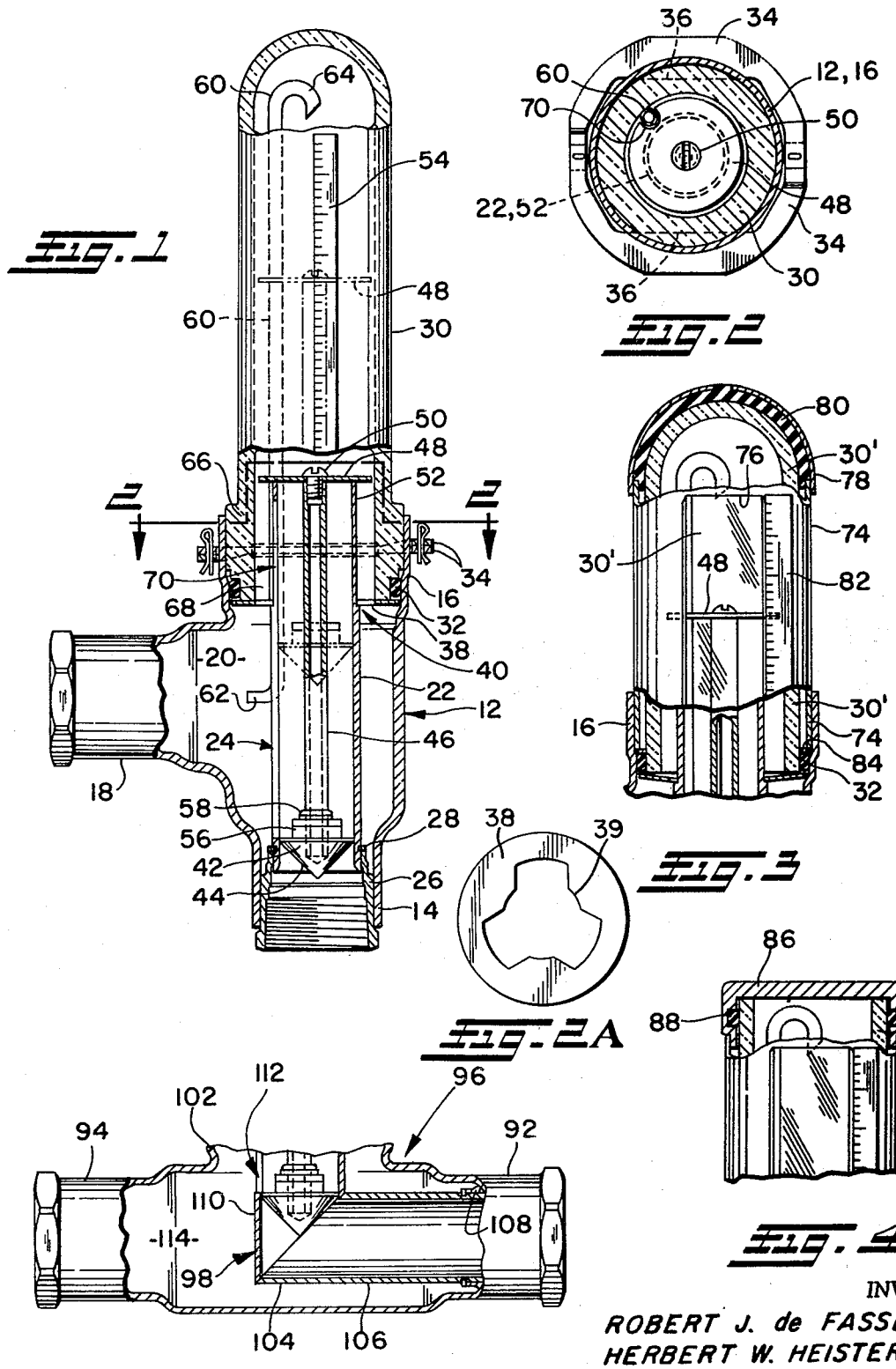

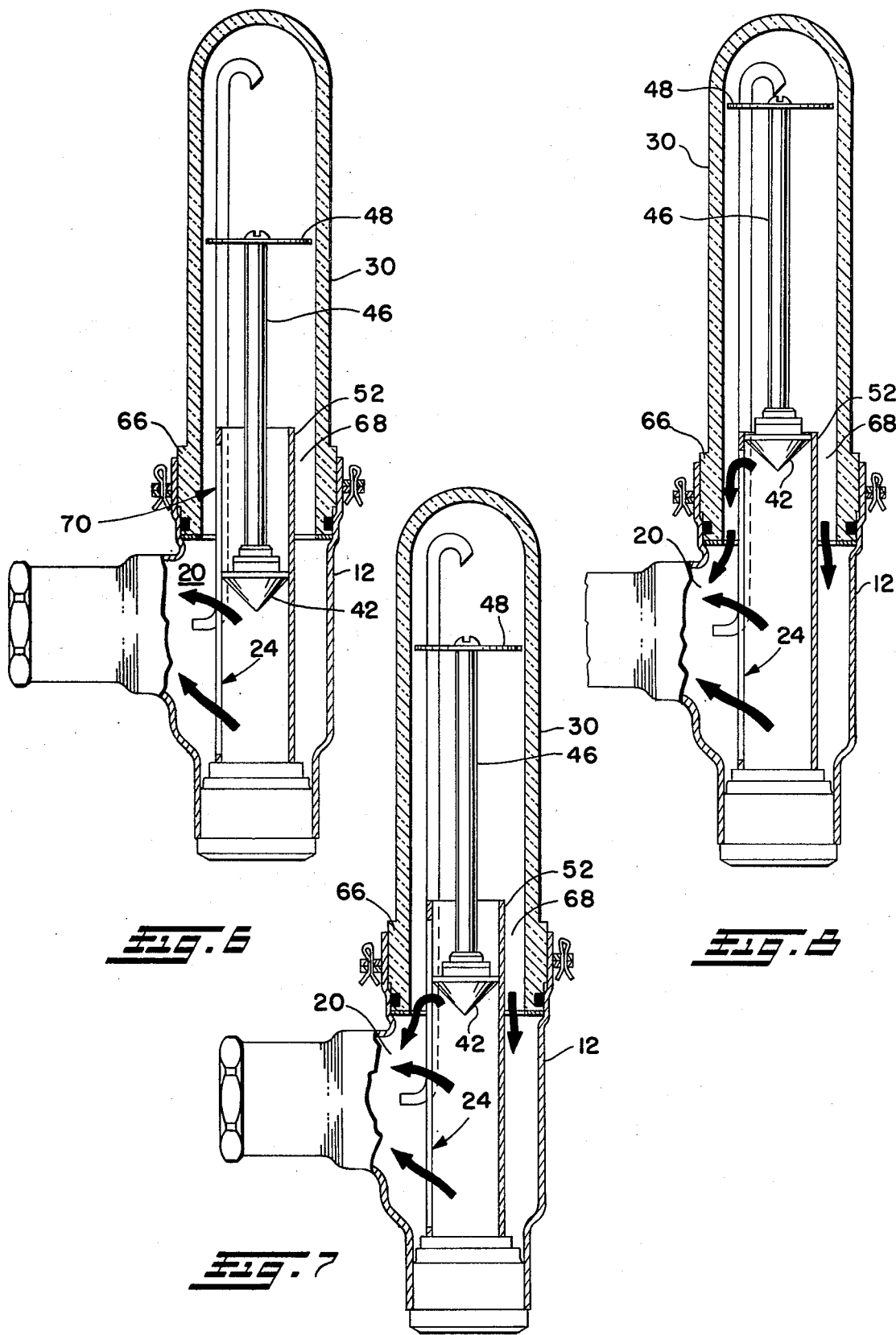

VARIABLE AREA FLOW METER

BACKGROUND OF THE INVENTION

The present invention relates to flow meters, and in particular, to a variable area flow meter.

It is known to provide a variable area or variable-orifice flow meter. The flow is through an orifice in the meter, and a weighted member is movably disposed across the orifice. The member is shaped so that as it moves it increases or reduces the effective flow area of the orifice. The position of the member in the orifice is determined by the rate of flow of fluid in the meter, the member moving to increase the effective flow area of the orifice in response to an increase in the flow rate.

An advantage of the variable area flow meter is that it usually has a wider range of capacities than other types of meters. However, it has the disadvantage that as the range of capacities is increased, the accuracy of the meter correspondingly decreases.

OBJECTS OF THE INVENTION

It is a principal object of the present invention to provide a variable area flow meter of both increased ranges of capacities or flow measurement and at the same time greater accuracy.

It also is an object of the present invention to provide a variable area flow meter in which the range of flow measurement can be adjusted for use with different fluids of different specific gravities.

It is another object of the present invention to provide a flow meter which is simple in construction using standard fittings and tube sizes, and at the same time which is versatile.

It is a further object of the present invention to provide a flow meter which can be easily disassembled for cleaning purposes and reassembled.

SUMMARY OF THE INVENTION

These and other objects are accomplished in accordance with the present invention, wherein there is provided a flow meter including a body portion having inlet and outlet ends, an elongated upright core tube within the body portion receiving the flow from said inlet end and having at least one longitudinally extending slot by which the flow is transmitted to the outlet end, a float piston confined by the core tube movable to expose a variable area of said slot, and means for indicating the position of the float piston in the core tube.

As an aspect of the invention, at a predetermined elevation of the float piston in the core tube, means are provided for reducing the increments of movement which the float piston makes for each increment of increase in flow in the meter.

Preferably, this includes an upright envelope connected to said body portion into which the core tube extends, the core tube being closely confined by the envelope to provide an annular passageway of small cross-sectional area. When the float piston is at the elevation of the envelope, the flow through the core tube slot at this elevation is subjected to a pressure drop in the annular passageway, which reduces the pressure drop across the slot in the area of the envelope. This in turn reduces the increments of movement which the float piston makes.

In a further preferred aspect of the invention, the float piston is connected to an upwardly extending piston stem, having at its uppermost end a flat indicator disc. The envelope defines at least one wall area through which the indicator disc is visible.

Suitable washer-shaped weights can be added over the piston stem onto the piston to vary the weight of the latter for use with different fluids of different specific gravities.

Preferably, the meter body portion is a standard tee including an adapter to hold said core tube within the tee inlet end, the core tube being shaped so that it has at least a portion extending in an upright direction into one of the other legs of the tee. The envelope is in the form of an inverted test tube coaxially seated in said other leg engaged by a releasable retaining ring. In this way the meter can be made from standard stock parts and is readily disassembled for cleaning purposes and reassembled.

Other aspects of the invention, objects and advantages thereof will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

The Figures herein illustrate a preferred form of the flow meter embodying the present invention, in which:

FIG. 1 is an elevation, partially broken away view of a flow meter in accordance with the concepts of the present invention;

FIG. 2 is a section view taken through line 2—2, FIG. 1;

FIG. 2A is a plan view of spider 38 of FIG. 1;

FIG. 3 is a partial elevation and broken-away view of the flow meter in accordance with an embodiment of the invention;

FIG. 4 is a partial elevation partially broken-away view of a further embodiment in accordance with the present invention; and FIG. 5 is a partial elevation partially broken-away view illustrating a still further embodiment in accordance with the present invention.

FIGS. 6—8 are schematic drawings of the flow meter of FIG. 1 illustrating operation of the meter;

DESCRIPTION OF THE INVENTION

Figure 9:
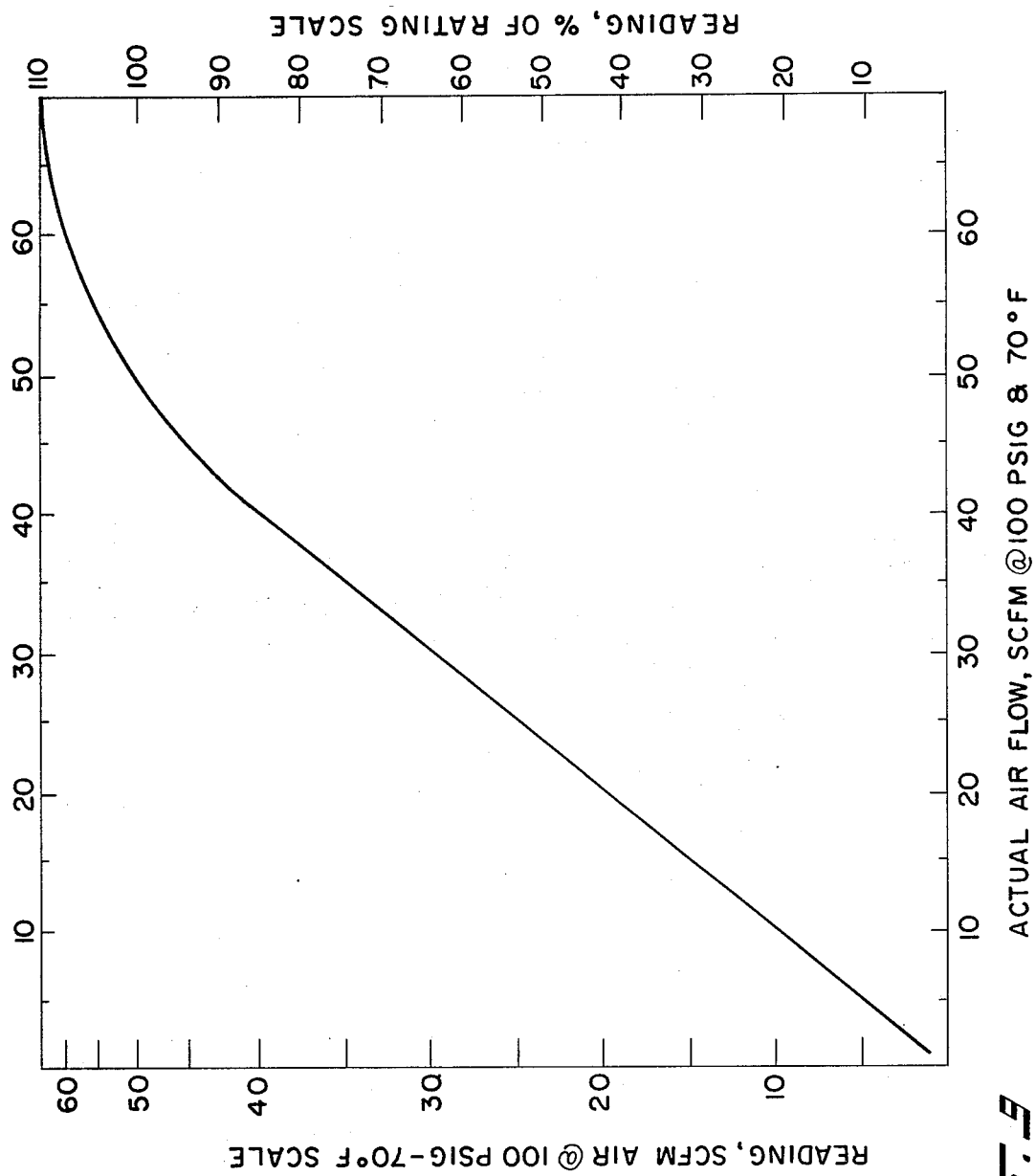
FIG. 9 is a graph also illustrating operation of the flow meter of FIG. 1.

Referring to the drawing, and in particular FIG. 1, the flow meter comprises a body portion 12 in the form of a standard reducing tee having a downwardly extending leg 14 constituting the flow meter inlet end, an upwardly extending leg 16, and a horizontal leg 18 constituting the flow meter outlet end.

The tee may be a standard cast or forged member of copper, brass, or a variety of materials. Between the inlet end 14 and outlet end 18, the body portion defines an enlarged chamber 20.

A core tube 22 is positioned within the body portion in communication with the inlet end 14. The core tube is a cylindrical upright member having a fixed inside diameter, and has along its side one or several longitudinally extending slots 24 terminating just short of the core tube ends. A cylindrical adapter 26 is press-fitted into the inlet end 14 of the flow meter, and the upper end of the adapter receives the core tube 22 positioning the core tube in an upright position and generally concentrically within the body portion 12. A snap ring 28 engages an annular slot in the lowermost end of the core tube and prevents the latter from sliding downwardly within the adapter 26.

The core tube can be of standard seamless brass tubing, or other materials, its length being such that it extends upwardly into and above the elevation of the body portion leg 16.

The upwardly extending leg 16 of the meter body portion is enclosed by an upwardly extending envelope 30 coaxial therewith. The envelope is in the shape of an inverted test tube and slides downwardly into the open end of the leg 16. In the embodiment shown in FIG. 1, the envelope is transparent around its periphery, and can be of a glass or clear plastic material. The envelope is sealed within the upwardly extending leg 16 by means of O-ring 32.

A pair of U-shaped retainer rings 34 encompass the leg 16 above the O-ring seal 32 and penetrate the wall of the leg on opposite sides at areas 36 (FIG. 2) to engage correspondingly shaped slots in the outer periphery of the envelope. In this way the envelope is held stationary within the leg 16. Beneath the lowermost end of the envelope is an annular spider stop 38. The spider stop is in the form of a washer having inwardly directed spaced apart fingers which seat on a shoulder 40 of the core tube 22, the outer circumference of the spider stop being engaged by an inwardly directed shoulder of the tee. By means of the spider stop, the O-ring seal 32 is retained within its seat defined by the envelope 30, particularly when a vacuum condition exists within the meter (as compared to a pressure condition).

In this respect, the flow meter can be used to measure fluids under pressure above atmospheric, or it is equally suitable for measuring the flow of fluids by vacuum. In either event, the glass envelope 30 is subjected to a thrust, on the one hand tending to expel the envelope from the body portion, and on the other hand, tending to draw the envelope downwardly into the body portion. The split retainer ring 34 is equally effective in either event in securing the envelope within the leg 16 of the body portion, and the O-ring seal is equally effective for either use.

The core tube 22 contains a freely sliding piston 42 shown in FIG. 1 close to the inlet end of the meter. The piston is provided with a conical or parabolic shaped surface 44 facing the inlet end 14 and direction of flow into the meter. The piston is connected to an upwardly extending stem 46 which extends axially within the core tube connected at the top to a readout disc 48 by means of screw 50. The readout disc is a flat thin plate member which is adapted to seat against the upper end 52 of the core tube. The length of the stem 46 is sufficient so that the piston 42 just closes off the slot 24 in the core tube to the incoming entering fluid side when the disc 48 is seated on the tube upper end 52.

Although the diameter of the piston 42 is slightly less than that of the core tube to permit free sliding of the piston, the clearance is sufficiently small so that leakage around the piston in the tube is an insignificant consideration.

Upon start of flow, the piston 42 rises vertically within the core tube to expose that area of the slot 24 necessary to permit fluid flowing in the meter to discharge into chamber 20 and through the outlet leg 18. Increasing flow rates require greater flow area provided by a greater rise in the piston. As the piston rises, the readout disc also rises in envelope 30, the latter being provided with an upwardly extending scale 54. The amount of flow in the meter is indicated by the elevation of the readout disc 48 with respect to the scale 54, which elevation will be proportional to the elevation of the piston 44 in the meter core tube 22, and thus the flow through the meter.

It is a feature of the invention that the readout disc is a very thin flat plate member to provide a thin or fine reading edge and facilitate accurate measurement. Also its diameter is nearly equal to the inside diameter of the envelope 30 (within a few thousandths of an inch) to permit use of the meter with semi-opaque fluids, and to avoid error through parallax.

The float piston assembly 44 (including stem 46 and plate 48) are of precisely calibrated weight. This weight imposes a resistance to flow, and as the fluid overcomes the weight it displaces the piston upward, the float piston rising to the point where the unit force imparted by the piston weight balances the pressure drop across the slot area created by the flow rate. Hence the location of the float piston along the core tube is a direct indication of the flow rate, and movement of the float piston is linearly proportional to the change in flow rate. However, as will be shown, the linear proportionality exists only with respect to movement of the float piston within the upper and lower limits of chamber 20.

Annular weight washers 56 can be slid downwardly on the float piston stem 46 to seat on top of the piston 42. A rubber retaining collar 58 can be used to hold the weights in place. By the use of different amounts of weight, the float piston can be calibrated for use with different fluids of different specific gravities, and by the use of proper weights, the scale 54 can be made to measure the flow rate directly of any fluid being measured.

By adding washers to the top surface of the piston 42, the center of gravity of the float piston desirably is kept as low as possible.

It is a feature of the invention that the stem 46 is hollow and the weight of the piston assembly can also be varied by adding shot, powdered metal, or other material into the stem.

A snorkel tube 60 is provided extending upwardly into the envelope 30. The snorkel tube is a small diameter, small bore tube fastened to the outside of the core tube 22, and is shaped and positioned so that it has a lower end 62 positioned in chamber 20 pointing downstream in the direction of the outlet port 18, and an upper end 64 at the top of the envelope 30. The upper end extends above the readout disc 48, at the upper extent of useful travel of the latter, and is bent in the form shown into a turned-down leg providing an upper stop for the readout disc and float piston. This keeps the float piston from riding out of the core tube, without having to close off the upper end of the core tube. The end 64 is beveled so that it remains open even when the readout disc 48 is against it.

A major function of the snorkel tube is to purge gases that are present within the envelope at the start of liquid flow, or are deposited there by release from the flowing media. This eliminates error which could occur in the meter because of pressure above the readout disc 48, improves readability of the meter, and purges out contaminants which could otherwise stagnate within the envelope.

The above is accomplished by the fact that the snorkel acts as a pitot tube in reverse. The velocity pressure of the outlet stream in chamber 20 is converted into negative static pressure, relative to the static pressure within envelope 30.

The snorkel also provides a "dash-pot" effect of value in stable reading of pulsating liquid flows. The snorkel establishes a full liquid column in the envelope 30, except for a small volume of gas trapped above the snorkel end 64, which tends to dampen movement of the readout disc 48. The trapped volume of gas serves as a resilient cushion to protect the meter from hydraulic shock (hammer). Also, the downward orientation of the snorkel inlet, in addition to serving as a float stop, minimizes vortexing of the liquid entering the envelope which might otherwise cause a sufficient reduction of the trapped gas volume to negate the cushion effect.

The readout disc 48 is cut out at 70 (FIG. 2) to provide clearance for the snorkel.

In the area of the lower end 66 of the envelope 30, the envelope is coaxial with an extent of the upper end 52 of the core tube to define a narrow annular passageway 68 (notice in particular FIGS. 6, 7 and 8). Substantially coextensive with this passageway is an upper extent 70 of the core tube slot 24. When the elevation of the piston 42 is such that it is adjacent the passageway 68, FIGS. 7 and 8, some of the flow through the slot of the core tube will be into the passageway. The passageway has a cross-sectional area which is substantially less than the dimensions of the chamber 20. It is apparent that as the flow into the passageway 68 increases with increased elevation of piston 42 the velocity of the flow in the confined constant area passageway 68 will increase at a disproportionately greater rate than the overall flow in the meter. This has the effect of increasing the fluid head. The result is that the increments of increase in elevation of the float piston per increment of increase in flow rate will become less and less at greater flow rates, clearly extending the effective range of the meter by a substantial amount (see FIG. 9).

For example, in a meter having a total float piston travel of 3 inches, the flow rate at 1 ½" elevation is 2.65 gal./min. Projected linearly, an elevation of 3 inches would record a flow rate 5.3 gal./min. The actual flow rate at 3 inches elevation is 12.3 gal./min., so that the effective range of the meter is increased by almost threefold.

In actual practice, the meter has the ability to produce high accuracy and good resolution at low flow rates, with the ability to read high flow rates with good accuracy or repeatability, but with less resolution.

If desired, the relationship of exposed slot area to piston area can be varied, to either enhance or accomplish the aforenoted displacement variation.

The actual increase in flow in the meter will occur mainly through the part of the slot 24 below the envelope 30.

Clearly the meter can be made linear, for full displacement of the float piston, by eliminating the outlet restriction downstream of a portion of the core tube slot. In this respect, it has been determined experimentally that the linear displacement to flow relation continues until the exposed slot area about equals the average of the piston-core tube area.

In the embodiment of FIG. 3, the envelope 30' is contained within a protective metal enclosure 74 which encompasses the envelope except for longitudinally extending windows 76 which expose the elevation of the readout disc 48 within the envelope. The upper end of the protective metal enclosure has secured thereto as by welding or brazing a cap 78 containing a cushion 80 of resilient material sandwiched between the envelope and cap to protect the envelope from the upper thrust force to which it is exposed. The metal enclosure protects the envelope from accidental breakage, and in addition provides a means for supporting the calibrated scale shown as item 82 on the surface of the enclosure along side of one of the windoes 76. At its lowermost end, the metal enclosure is seated within the open end of leg 16 in telescoping relationship therewith. In this embodiment, the envelope 30' is a straight-sided cylindrical member, sealed by O-ring 32. Above the O-ring is an annular washer 84 on which the lower end of the enclosure 74 seats. A suitable pair of retainer rings, such as rings 34 of FIG. 2, can be provided to hold the enclosure within the leg 16.

FIG. 4 illustrates a still further embodiment of the invention, in which the envelope 30", as of tempered glass, is a cylindrical member open at both ends. A cap 86 extends over the uppermost end of the envelope sealed to the envelope by means of O-ring 88. The cap telescopes into the metal enclosure 90, and is secured therein as by welding or brazing. The lower end of the enclosure 90 may be secured to body 12 by suitable split retaining rings such as items 34 of FIG. 2.

In FIG. 5, the inlet and outlet ends 92, 94 of the tee 96 are horizontally remote from each other, and the meter components 98 are arranged to extend upwardly into the centermost upright leg 102 of the tee. In this example, the core tube 104 is provided with a horizontally extending portion 106 which is engaged by an adapter 108 seated within the inlet end 92 of the tee, the core tube extending upwardly in portion 110 from said horizontal portion 106. In operation, the embodiment of FIG. 5 functions in a manner similar to that of FIGS. 1—4, flow entering through the horizontal portion of the core tube assembly passing upwardly and to the left through slots 112 in the side of the core tube and into a chamber 114 communicating with the outlet end of the body. It has been demonstrated that with the design of FIG. 5, wherein the body cavity is larger and longer than that in the embodiment of FIG. 1, there is a greater percentage of the slot area below the envelope enclosure, and tests on this meter show a substantially linear piston travel vs. flow rate relationship, the curve becoming asymptotic only at the very highest flow rates within the range of measurement of the meter.

When visible flow indication is not required and an external signal is required, the location of the float may be picked up magnetically, photoelectrically, by radiation, or by other accepted means wherein the position signal is transmitted unlimited distances for readout or control.

The present invention is especially useful in refrigeration systems, most of which presently use a liquid line sight glass to insure full refrigerant charge at installation, and to indicate loss of refrigerant. The sight glasses, however, give no indication of system capacity. The present meter would not only indicate amount of charge, but would also enable an instant appraisal of the system refrigerating capacity, the actual flow of liquid available to absorb the latent heat of vaporization in the system being proportional to the refrigerating capacity. The meter would not record flash gas or uncondensed liquid flow (which does not absorb heat of vaporization). In addition, the snorkel would eliminate the "trapped bubble" problem which periodically interferes with the use of standard sight glasses.

The meter could be calibrated in terms of "BTU's" or "Tons" refrigerant used.

A system moisture indicator consisting of a paint with salts which indicate moisture by color change, as is now popular with sight glasses, could be incorporated on the float.

Advantages of the invention should be apparent. In particular is the provision of a flow meter having a large range of capacities with good resolution at low flow rates. In addition, the meter is useable with a large number of different fluids, the snorkel providing accuracy and readability even with highly volatile fluids. Further, the meter is designed so that it can be constructed to a large extent from standard off-the-shelf parts. The only items requiring close tolerance sizing are the piston and slot in the core tube. The meter is easily dismantled for cleaning purposes or calibration, and reassembled. If it can be considered that an accuracy of about 5 percent is normally required, a single flow meter body can accommodate different floats, core tubes, and weights for conversion to applications involving different fluids or flow rates.

Although the invention has been described with respect to specific embodiments, other variations within the scope of the following claims will be apparent to those skilled in the art.

We, therefore, particularly point out and distinctly claim as our invention:

1. A flow meter comprising a body portion including inlet and outlet ends; an upright elongated core tube within said body portion in flow communication with said inlet end; said core tube including an upper end and defining at least one longitudinally extending slot, the slot being in flow communication with said body outlet end; piston means within said core tube movable to expose a variable amount of said slot to said inlet end; means for indicating the position of the piston means in the core tube; an upright elongated envelope coaxial with said core tube and extending above the core tube, the envelope and core tube having overlapping portions which are coextensive and defining therebetween a confined annular passageway, the core tube slot extending upwardly so that a portion thereof is coextensive with said passageway, the cross-sectional area of the passageway being sufficiently small to obtain a relatively high velocity flow in the passage which increases with increased elevation of the piston means, the increments of movement of the piston means per increment of increase in flow in the meter at the elevation of said passageway being less than the increments of movement of the piston means per increment of increase in flow in the meter at elevations below the passageway.

2. The meter of claim 1 wherein said envelope is at least partially transparent; said indicating means comprising a readout disc connected with said piston means and contained by said envelope.

3. The meter of claim 2 wherein said envelope has indicia thereon at spaced elevations along the envelope.

4. The meter of claim 2 wherein said envelope is only slightly larger in diameter than said readout disc, the latter having a thin peripheral edge to facilitate readability of the disc.

5. The meter of claim 1 including means for differently weighting said piston means to calibrate the meter for fluids of different specific gravities.

6. The meter of claim 5 wherein said piston means includes an axial upwardly extending stem; a flattened circular readout disc attached to the upper end of said stem, the disc indicating the position of the piston means in the core tube; said means for differently weighting the piston means comprising washers positionable over said stem onto the upper surface of the piston means.

7. The meter of claim 1 including means for differently weighting said piston means to calibrate the meter for fluids of different specific gravities; said stem being hollow, said means for differently weighting the piston means comprising particulate material positionable in said stem.

8. The meter of claim 1 wherein said body portion is a standard tee, including adapter means removably positioning the core tube within the tee in communication with one of the legs of the tee, one end of the core tube extending axially into another leg of the tee; an envelope protruding from said other leg extending axially with respect to the core tube and above the core tube, the envelope being at least partially transparent, said indicating means comprising a readout disc connected with said piston means and contained by said envelope; further including means releasable securing the envelope to said other leg.

9. The meter of claim 8 wherein the core tube extends between axially opposed legs of the tee.

10. The meter of claim 8 wherein the core tube extends between one of the axially opposed legs of the tee and an adjacent leg of the tee, the core tube having an ell-shaped configuration.

11. The meter of claim 8 including a non-breakable guard enclosure encompassing said envelope having at least one window therein.

12. The meter of claim 14 including indicia on said guard enclosure adjacent said window.

13. A flow meter comprising a body portion including inlet and outlet ends; an upright elongated core tube within said body portion in flow communication with said inlet end; said core tube including and upper end and defining at least one longitudinally extending slot, the slot being in flow communication with said body outlet end; piston means within said core tube movable to expose a variable amount of said slot to said inlet end; an envelope coaxial with the core tube extending above the core tube, the envelope being at least partially transparent; indicating means comprising a readout disc connected with said piston means and contained by said envelope for indicating the position of the piston means in the core tube; and a siphon-tube extending from the outlet end of said body portion into said envelope to above the uppermost point of travel of the readout disc, said siphon-tube having an end facing the body portion outlet end.

* * * * *